United States Patent [19]
Krupp et al.

[11] 3,770,895
[45] Nov. 6, 1973

[54] DYNAMICALLY SWITCHING TIME SLOT INTERCHANGER

[75] Inventors: Roy Stephen Krupp, Rumson; Lawrence Andrew Tomko, Redbank, both of N.J.

[73] Assignee: Bell Telephone Laboratories, Incorporated, Berkeley Heights, N.J.

[22] Filed: Dec. 2, 1971

[21] Appl. No.: 204,143

[52] U.S. Cl. .......... 179/15 AQ, 340/174
[51] Int. Cl. .......... H04j 3/00
[58] Field of Search .......... 179/15 AQ, 186 F; 340/172.5, 174; 307/224, 241, 242

[56] References Cited

UNITED STATES PATENTS

| | | | |
|---|---|---|---|
| 3,470,547 | 9/1969 | Bobeck | 340/174 |
| 3,613,056 | 10/1971 | Bobeck | 340/174 |
| 3,668,667 | 6/1972 | Copeland | 340/174 |
| 3,458,659 | 7/1969 | Sternung | 179/15 AQ |
| 3,632,883 | 1/1972 | Aagaard | 179/15 AQ |
| 3,632,884 | 1/1972 | Inose | 179/15 AQ |
| 3,514,541 | 5/1970 | Inose | 179/15 AQ |
| 3,263,030 | 7/1966 | Stiefel | 179/15 AQ |

*Primary Examiner*—Kathleen H. Claffy
*Assistant Examiner*—Thomas D'Amico
*Attorney*—W. L. Keefauver et al.

[57] ABSTRACT

Selectively actuatable gates establish coupling paths between corresponding stages of two shift registers while at least one of the registers is being operated in its shifting mode with respect to signals being coupled through such paths. Each register has a full frame of time division multiplex signal storage capacity, and gate selection is accomplished by predetermined control signal patterns in respective control memory loops for the gates. Implementations for discrete device technology and magnetic single-wall domain technology are shown.

15 Claims, 6 Drawing Figures

DYNAMICALLY SWITCHING TIME SLOT INTERCHANGER

BACKGROUND OF THE INVENTION

1. Field of the Invention

This invention relates to time slot interchangers for time division multiplex communication systems.

2. Description of the Prior Art

In time division multiplex communication systems, time slot interchangers have utilized some form of shift register arrangement in which a control memory for an input time division multiplex signal line actuates gates to steer time slot signal units to certain shift register input locations, or to derive signals from certain shift register output locations, for rearranging the time slot order of the signals in the interchanger output line to an order which may be different from that which prevails at the input line. Suitable pathfinding logic hardware, or program, is utilized in conjunction with a central control signal processor to determine what time slots to employ to establish an appropriate call connection path for each time slot signal. Thereafter, gate number signal representations are stored in control memory time slot word locations so that the memories can be recurrently scanned during each time division signal frame for controlling the time slot interchanger gates in an appropriate manner.

Time slot interchangers are known in which control memory signals actuate gates for steering time division input signals from a single input line to a particular stage of a shift register, or for deriving time division signals from a particular stage of a register as already noted. In addition, it is also known to control steering gates for both the input and the output to a single time slot interchanging shift register with respect to a plurality of input lines and a plurality of output lines. It is also known to shift a group of time slot signals from a single line into a first shift register, transfer them to a first buffer register, then utilize a crosspoint matrix switching array for further transferring the time slot signals to selectable stages of a second buffer register, and thereafter transfer the contents of the second buffer register in bit-parallel form to a second shift register from which the signals are shifted in series to an output line. Likewise, it is known to secure a predetermined amount of time slot delay in a signal transmission path by applying time slot signals in bit series into a first tapped delay line, which is associated with a crosspoint switching matrix for selecting an output tap of the first delay line for coupling to a predetermined input tap of a further tapped delay line so that the total delay achieved through the two delay lines and the crosspoint matrix is equal to the desired time slot delay.

The aforementioned time slot interchanging arrangements all require extensive gating of either the crosspoint matrix type or the fan-in or fanout type which cannot be readily directly implemented in present day planar shifting technologies. These technologies are those wherein a signal-representative state of matter is shifted in a predetermined way in a homogeneous body of material. Two examples of such technologies are the magnetic, single-wall, domain devices and the charge coupled devices.

It is, therefore, one object of the present invention to increase the range of technologies in which time slot interchangers can be readily implemented.

It is another object to improve time slot interchanging circuits.

A further object is to perform time slot interchanging by an interchanging algorithm which can be implemented at least in planar shifting technologies.

Yet another object is to achieve the time slot interchanging function in a magnetic, single-wall domain, device arrangement.

SUMMARY OF THE INVENTION

The foregoing and other objects of the invention are realized in an illustrative embodiment in which a time slot interchanger is formed by input and output shift registers having circuits for coupling each of plural predetermined stages of the input register to only one different stage of the output register. The coupling circuits are selectively actuated while at least one of the registers is operating with respect to signals being coupled so that a signal in any time slot of a time division multiplex signal frame in the input shift register can be transferred to any time slot of a corresponding signal frame which is to be subsequently transmitted from the output shift register.

It is one feature of the invention that the operation of the time slot interchanger in a dynamic mode, represented by accomplishing selective signal transfer during shift register operation, as just outlined, reduces the need for control signal fans and for the relatively complex gating of crosspoint switching matrices.

It is another feature that the coupling paths between the shift registers are each controlled by a separate control memory loop.

BRIEF DESCRIPTION OF THE DRAWINGS

A more complete understanding of the invention and its various features, objects, and advantages may be obtained from a consideration of the following detailed description in connection with the appended claims and the attached drawings in which:

DETAILED DESCRIPTION

Figure 1:
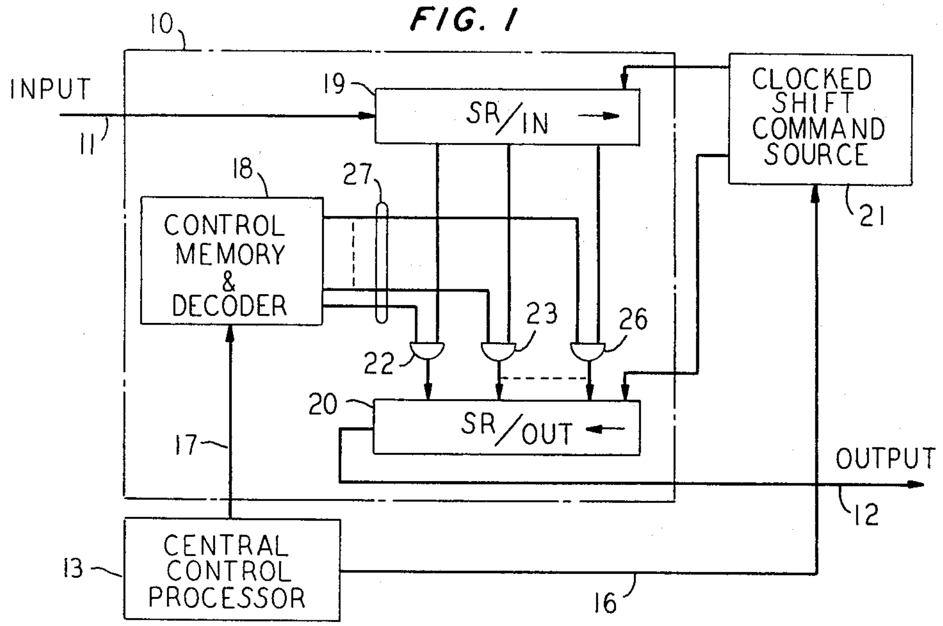
FIG. 1 is a simplified block and line diagram of an electric circuit time slot interchanger in accordance with the invention.

In FIG. 1 a time slot interchanger 10 receives, on an input time division multiplex signal path 11, time division multiplex signals in a first predetermined time slot signal sequence in recurrent time division signal frames. Each time slot signal in a time frame includes a sample from a different call connection. The interchanger 10 alters the time slot signal sequence as required for achieving the respective time division call connections in a signal communication network not otherwise shown in detail. The new time slot signal sequence is supplied to an output time division multiplex signal path 12 for further utilization in the network. A central control processor 13 is provided for overall network control as is known in the art. This processor provides network clock on a circuit 16, and it performs the usual network administration and connection functions. In conjunction with those functions, pathfinding operations are carried out to determine input and output time slot numbers for achieving the desired call connections. These time slot numbers, as indicated by appropriate signal representations, are supplied on a circuit 17 to a control memory and decoder 18 for use in time slot interchanger 10.

Within the interchanger 10 an input shift register 19 and an output shift register 20 simultaneously receive shift signals from a clocked shift command source 21 which is operated in response to clock signals on the circuit 16. The shift signals are advantageously provided at the input signal bit rate, which is also the input time slot signal rate where input signals have one-bit time slot words. Corresponding stages of the shift registers 19 and 20 are coupled together through selectively controllable coupling signal paths which are, in FIG. 1, represented by control coincidence gates 22, 23, and 26. Each such gate couples the output of one stage in shift register 19 to only one corresponding stage in shift register 20 when such gate is enabled by an output signal on one of a set of control circuits 27 from the control memory and decoder 18. Each of the shift registers 19 and 20 has sufficient stages to accommodate a full frame of time slot signals. Depending upon the nature of the communication network in which the interchanger 10 is utilized, each time slot may include a single one-bit word or a multibit word in which the bits are provided in bit series or in bit parallel. It is assumed for the moment in connection with FIG. 1 that each signal time slot on path 11 includes a single one-bit word. Arrangements utilizing larger numbers of bits in each time slot word will subsequently be discussed.

It will be observed in FIG. 1 that shift register 19, i.e., the input shift register, receives time division signals from input path 11 at the left-hand end of the register 19, and those signals are shifted through the register toward the right. Similarly, in output shift register 20 time slot signals received from control gates 22, 23, and 26 are shifted toward the left; and at the left-hand end of register 20 they are applied to the output time division path 12. Thus, shift registers 19 and 20 are said to operate in opposite directions with respect to the gated coupling paths between their corresponding stages. A result of this type of connection and operation of the registers is that, while time slot signals of a time division signal frame are being shifted into the input shift register 19, an empty time division frame is in effect being shifted into the output shift register 20. Consequently, each time slot signal from input path 11 has access to any time slot position of the time division signal frame proceeding through output shift register 20 to the path 12.

It will be seen that if a coupling path is enabled between a central stage in shift register 19 and a corresponding central stage in register 20, and if the control gate, e.g., gate 23, in that path is the only one operated during each time slot of a signal frame, the signal output on path 12 must appear unchanged in time slot order with respect to the signal input from path 11. Similarly, if it is assumed that all of the control gates are operated at once in the same time slot when a full frame of time slot signals are present in register 19, that frame of signals will appear in output path 12 in exactly the reverse time slot sequential order. Likewise, any output time slot sequence configuration can be achieved by the appropriate storage of control gate names in the time slot word locations of control memory and decoder 18. The output sequence configuration will depend upon network pathfinding operations carried out from time to time in appropriate fashions.

It is possible, in systems wherein each time slot includes only a one-bit word, for an input time slot signal in register 19 and an output destination time slot location in register 20 to pass one another in their respective registers at points which lie between control-gated stages. This is called a "half-word" problem. Various solutions are available for different types of applications. For example, shift command pulses to registers 19 and 20 can be alternated so that only one signal frame is shifted at a time. Another solution is to employ a buffer register so that one frame is held stationary while signals are being coupled through selected coupling paths, and this form will be discussed later in connection with FIG. 4. A further solution is to allow each shift register stage to store no more than a half word and provide a coupling path for each half-word position along the registers. Consequently, the half-word problem does not arise.

When one gated coupling path is provided for each half-word position in registers 19 and 20, it is necessary that each time slot word include an even number of bits. Consequently, the half-word problem does not arise.

Figure 2:
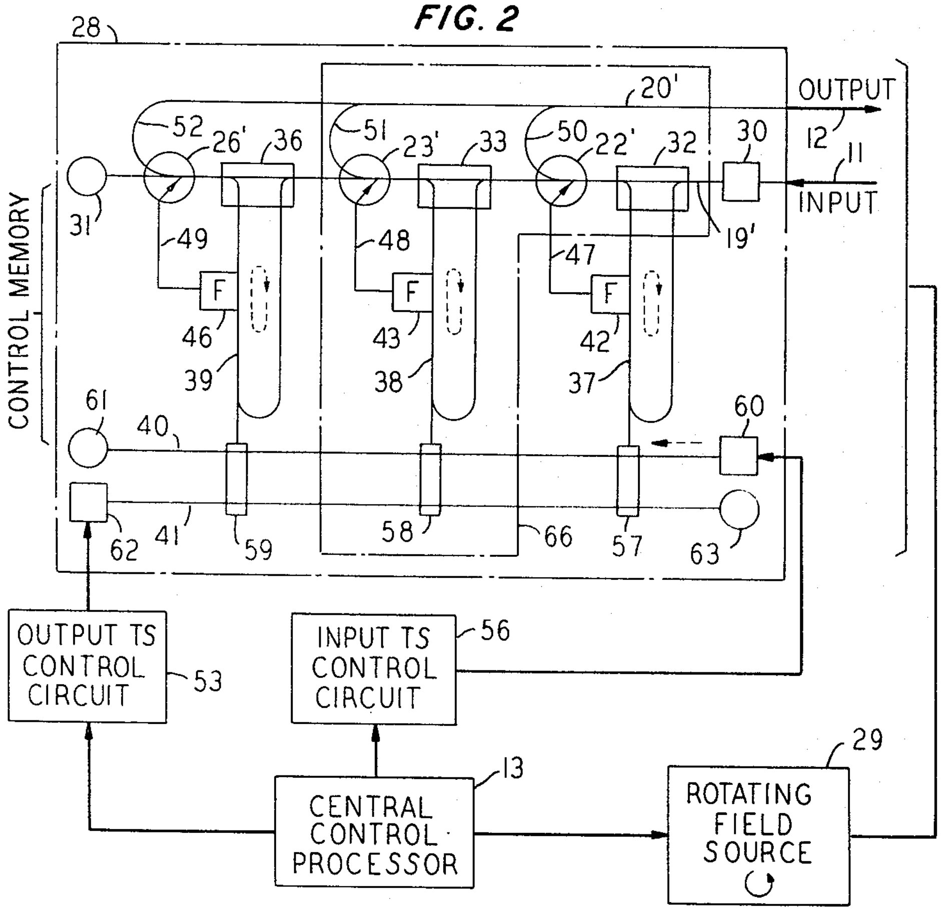
FIG. 2 is a schematic diagram illustrating a magnetic, single-wall domain, time slot interchanger in accordance with the invention.

In FIG. 2 the time slot interchanger 10, which has just been described, is implemented in a planar shifting technology wherein the positions of signal representations are controllably shifted in a homogeneous planar material. The illustration in FIG. 2 relates to a magnetic, single-wall domain form of planar shifting technology. In this embodiment the interchanger shift registers, the switching gates, the control memory, and the address insertion logic are all implemented in the magnetic domain technology.

The single-wall magnetic domain technology is now well known in the art as evidenced by the numerous public documents on the subject. One overall presentation is found in The Bell System Technical Journal, Vol. XLVI, No. 8, October 1967, at pages 1901 et seq. In essence, a slice 28 of material is provided which can host single-wall magnetic domains that are orthogonally oriented with respect to the plane of the slice. External magnetic bias, not shown, is advantageously employed to determine domain size and configuration. Domains are moved in the host material by providing various magnetic field concentrations to attract or repel a domain. In certain cases the domains interact to repel one another. One way to provide the mentioned field concentrations is to immerse the substrate slice of host material in a rotating magnetic field so that the field extends in the plane of the slice and is periodically reoriented parallel to the plane. For cooperating with the field, there are provided, on the surface of the slice, magnetic material overlays which are configured in repetitive patterns of film elements to concentrate the field in different ways at element ends or angles as the field reorients.

In FIG. 2 the host material slice 28 is schematically represented by a large broken-line rectangle. Within the rectangle the principal solid lines represent signal paths to be designated and which are domain propagation paths of the type shown, for example, in A. H. Bobeck U.S. Pat. No. 3,534,347. Those paths, and interaction regions, which correspond to structures in the interchanger 10 of FIG. 1 are indicated in FIG. 2 by the same or similar reference characters. The processor 13 is also utilized in FIG. 2 and exercises control of a rotating field source 29 which provides the inplane reorienting field for the slice 28. Thus, the source 29 in the single-wall domain technology corresponds approximately to the shift command source 21 of FIG. 1.

In FIG. 2 it is assumed that each time slot word has a duration of ten bits so that each half word is five bits long. The time slot signals are supplied in bit-series fashion on the input path 11 to a domain generator 30 of any suitable type. One form of domain generator and a collapser, or annihilator, are shown in the mentioned Bobeck patent. This arrangement assumes that the time slot signals are provided in an electrical format; but, of course, other formats could be utilized. The input shift register 19' extends from the domain generator 30 to a domain annihilator 31 through alternate domain interaction regions 32, 33, and 36, and domain gating regions, 22', 23', and 26'. One gating region and an associated interaction region are provided for each half word of storage capacity in register 19. Details of these interaction and gating regions will be discussed in greater detail in connection with FIG. 3. It is sufficient to note here that the effect of the gating regions, hereinafter simply called gates, in the shift register 19' is to allow data domains to pass through the register data path toward annihilator 31 until an activated gate is encountered. Such a gate diverts the data domain from the data path of register 19' through an associated coupling path to a corresponding stage of the interchanger output shift register 20'. In the latter register the domains are shifted toward the right and ultimately leave the time slot interchanger to be coupled to a suitable utilization circuit, not shown. An interaction region has a similar effect with respect to the control memory, as will be described. Registers 19' and 20' operate simultaneously for shifting domains in opposite directions with respect to coupling paths 50, 51, and 52 between the registers, and so producing an interchanging effect which is analogous to that produced by the operation in FIG. 1 of registers 19 and 20 with the associated FIG. 1 coupling gates under the influence of shift command source 21 and the control memory and decoder 18.

Each of the control gates of the input shift register 19' is controlled by a control signal pattern which is circulated in a control memory loop associated with that gate. Thus, in FIG. 2 control memory loops 37, 38, and 39 are associated with the control gates 22', 23', and 26', respectively. Each control memory loop is arranged to operate as a recirculating shift register, and contains a control signal magnetic domain pattern which is provided thereto by the operation of a pair of address insertion shift registers 40 and 41 in a manner which will be subsequently described. For the purposes of discussion of FIG. 2, it is assumed that domains circulate in the respective control memory loops in a clockwise direction as indicated by a broken-line arrow at each loop. Thus, domains are propagated upward along the left-hand side of each loop through respective domain fanout regions 42, 43, and 46 to the respective domain interaction regions 32, 33, and 36. From the latter interaction regions, the domains are propagated downward in the right-hand side of each loop to complete the loop path. An input point is advantageously provided in the lower left part of each loop for writing in new control information from time to time.

Each fanout circuit responds to one input domain to produce a single output domain for continued circulation in the control memory loop, and additionally generates a domain pattern for appropriately controlling the control gate associated with the same memory loop. A number of forms of such circuits are known in the art. For example, one multistage field access form, i.e., a form operating as a function of the inplane rotating field and the magnetic overlay configuration, is found in the copending I. Danylchuk application Ser. No. 41,028, filed May 27, 1970, now U.S. Pat. No. 3,713,118, and assigned to the same assignee as the present application. Similarly, a single stage of field access fanout can provide a simple two-for-one fanout, and an electrically pulsed domain splitter then operates on the domain that is branched out of the control memory loop to produce a domain train of the desired length for interchanger gate control. Illustrative splitters are found in an A. H. Bobeck U.S. Pat. No. 3,503,055 and in an R. F. Fischer U.S. Pat. No. 3,564,518. Whatever the fanout form found most convenient for a particular interchanger application, the output domain train is propagated along the respective one of control propagation paths 47,48, and 49 to the interchanger control gates.

The fanout domains are applied to one of the control gates, e.g., gate 23', where they interact with data domains in the shift register 19'. The fanout domains enter that data path and are propagated to the left toward the annihilator 31. However, data domains are forced, by domain interaction with fanout domains, to enter the associated coupling propagation path 51 through which they are applied to the output shift register 20' for propagation to the output of interchanger 10. It is apparent, of course, that in each control memory loop the fanout region must be located with respect to the control memory loop input coupling point so that a control signal domain, which is entered into the loop from the shift register 40, will reach the fanout region and ultimately produce a fanout domain stream in time to interact at the associated control gate with the first domain of the time slot data word which is to be switched from input register 19' to output register 20' at such gate. If the address insertion register 40 were operated to cause a train of domains of time slot word size to be entered into the control memory loop instead of single-wall domain, a single stage fanout region could be employed; but then a different technique for erasing the control memory than that which will be hereinafter described must be employed.

The technique, to be described, for erasing control domains in a control memory loop assumes a communication network in which each time slot word has a predetermined bit location, called a busy bit, which is dedicated for indicating whether or not the time slot word is in use for a call connection in the time division communication network. Thus, if a domain is present in the busy bit location, the word is in use for a call connection; and if the busy bit domain is absent, the word is available for use in a call connection. This busy bit is initially written and erased at appropriate times in a time division multiplexer, not shown, for the network. Such a multiplexer receives digital or analog signal samples from plural signal channels and time multiplexes them onto a common time division path. That busy bit is utilized in a domain interaction region, such as 33, which associates a data signal path, such as the data path of shift register 19', with a control memory loop, such as the loop 38 in FIG. 2. The nature of the interaction region 33 is such that a control domain that is propagated up the left-hand side of loop 38 always enters the data path of register 19 and is propagated to the left through control gate 23' and coupling path 51 to register 20'. The loop 38 is arranged so that the propagation delay from its input point to the interaction region 33 is appropriate to cause a control domain, which has been entered into the loop, to appear at the interaction region 33 simultaneously with the busy bit for the data time slot word which is controlled by that control loop domain.

If a domain is present in the busy bit location of the time slot word, the interaction of that domain with the control domain at the interaction region 33 causes the busy bit domain to replace the control domain in control loop 38 while the control domain replaces the busy domain in the data path. If no domain is present in the busy bit position, there is nothing to replace the control domain in loop 38; and that domain is thus erased by virtue of its removal into the data path. Consequently, there is no control domain thereafter circulating for that time slot word to the fanout region 43 for controlling gate 23'. Thus, in the next data signal frame, gate 23' is not operated; and the entire time slot word, including its busy bit location, passes through gate 23' to the annihilator 31. Any communication network stage following the stage including time slot interchanger 10 can see no busy bit for that time slot word, and it control memory is similarly erased. Thus, once the busy bit has been erased at the input multiplexer for the network, similar erasures in control memories automatically ripple through the network in subsequent frames until the entire call connection is taken down.

As in most time slot interchanging arrangements, it is necessary for the interchanger of FIG. 2 to determine the input signal time slot number $TS_i$ during which a particular time slot signal is applied on the path 11 to the interchanger. It is also necessary to determine the number of the output time slot $TS_o$ to which the input time slot signal is to be shifted prior to transmission on the output path 12. Such input and output time slot information is advantageously obtained in accordance with any convenient one of the known pathfinding techniques that is suitable for the time division multiplex systems in which the interchanger is employed. However, communication equipment which is analogous to the registers 19', 20', and their coupling paths 50–52 is employed for writing new control information into the control memory loops; and the operation of the analogous equipment in such that it is unnecessary to make a specific determination of which loop to write or in which time slot the associated control gate should actually be operated. The use of such analogous equipment for writing new control information into the control memory loops follows a technique to be hereinafter described and which is called "time coded signaling."

Processor 13 operates in response to the input and output time slot number information to actuate an output time slot control circuit 53 and an input time slot control circuit 56. The circuits 53 and 56 produce time coded signals in the form of a timing pulse in each of those output and input time slots, respectively. These pulses are applied to domain generators 62 and 60, respectively, for entering domains in address insertion shift registers 41 and 40, respectively.

The latter registers have a total bit storage capacity which is equal to a frame of signal bits, as was the case for data shift register 19' and 20', plus additional stages having a stage delay during the shifting operation which is equal to the memory loop propagation delay from the control gating region of the control memory loop that receives the control domain to the shift register 40. That delay is typically one-half of a frame since each memory loop is a full frame in length. The additional delay stages in registers 40 and 41 are included at the register inputs adjacent to the respective domain generators although such stages are not specifically shown in order to avoid unduly complicating the drawing. Registers 40 and 41 are spaced closely together so that there can be domain interaction between domains passing one another while being propagated in opposite directions through the registers 40 and 41, respectively. In particular, an interacting region is provided along the address insertion registers at the input to each of the interchanger control memory loops. Such interaction regions each includes as an alternate domain path the input to the associated control memory loop into which a domain from register 40 is diverted if it appears in the interaction region simultaneously with a domain from register 41.

A domain from generator 60 is propagated to the left toward a domain annihilator 61. A domain from generator 62 is propagated to the right toward an annihilator 63. These two address insertion domains meet in an interaction region at the center of the registers 40 and 41 if input and output time slot numbers are equal. If those numbers are unequal, the domains meet at an interaction region to the right or left of the center region by an amount determined by the relative magnitudes of the time slot numbers. Thus, if the input time slot number is three smaller than the output time slot number, the two domains will meet three regions to the right of the center region.

Figure 3:
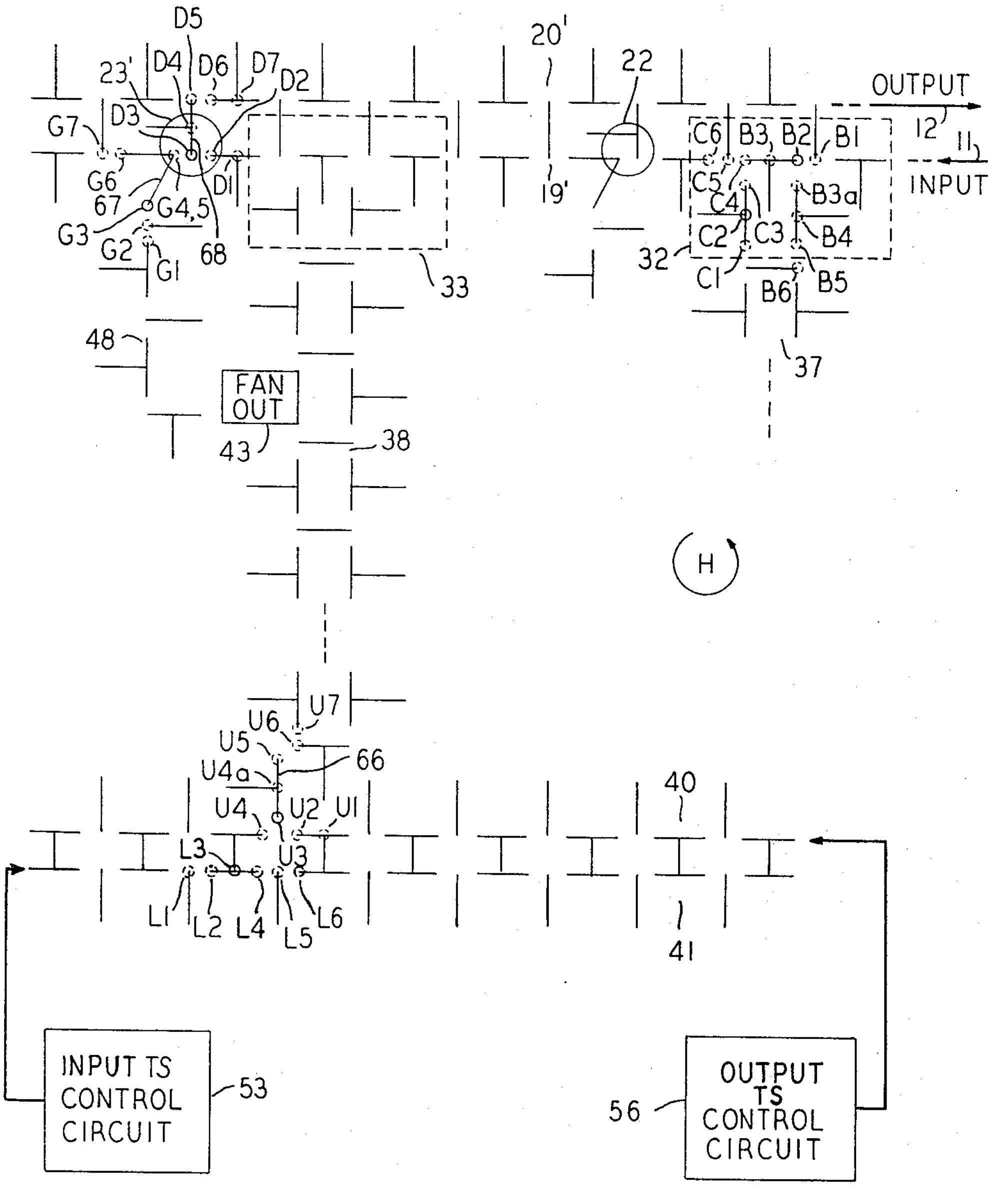
FIG. 3 is a detailed diagram of a portion of the magnetic overlay of the interchanger in FIG. 2.

The domains interact in the region where they meet, in a manner to be indicated in FIG. 3, to force the domain in the shift register 40 to be diverted into the control memory loop associated with that interaction region. Meanwhile, the domain in register 41 proceeds to the right to the annihilator 63. The inserted domain in the control memory loop is utilized, as has been herebefore described; and the address insertion registers and associated circuits 53 and 56 are not further employed until such time as a new call connection is to be established by inserting a new control domain in another of the control memory loops.

It will be apparent from the foregoing description that different combinations of input time slot numbers $TS_i$ and output time slot numbers $TS_o$ can produce operation of different interchanger control gates in the same time slot because the corresponding time coded signals from circuits 56 and 53 produce domains that meet in different ones of the interaction regions 57–59. Similarly, other time slot number combinations will result in operation of a single control gate in each of a plurality of different time slots of a frame because signals from circuits 56 and 53 produce pairs of domains that meet at the same one of the interaction regions 57–59. Thus, the analogous equipment achieves address insertion into the control memory loops for any combination of control gate operations necessary to allow registers 19' and 20' to perform the full range of time slot interchange possibilities within a signal frame.

In FIG. 3 there is shown overlay detail for the portion of the FIG. 2 time slot interchanger enclosed within the broken-line rectangle 66. Thus, portions of each data register and address insertion register are shown along with the control memory loop 38. A portion of control memory loop 37 is also shown. The well-known T and bar type of overlays for defining domain propagation paths are utilized in the overlay patterns in FIG. 3. Oppositely propagating shift registers 19' and 20' are spaced apart sufficiently to prevent significant interaction between domains passing one another in the two registers. The same applies for the registers comprising the two sides of memory loop 38. Registers 40 and 41 are close enough to one another to enable significant interaction between passing domains. The rotating magnetic field is assumed to be reorienting in the counterclockwise direction as indicated by the arrow H at the right-hand side of FIG. 3.

The address insertion interaction just described will now be illustrated in connection with FIG. 3. As previously noted, any domain entered into register 41 proceeds regularly along that register from left to right. Similarly, a domain entered in register 40 proceeds regularly from right to left until it encounters an interaction region simultaneously with a domain in the register 41. Under such conditions the domain in the register 40 has available to it an alternate propagation path through a lazy T 66, which couples the register 40 to the input of recirculating control memory loop 38. This interaction is considered in terms of discrete domain positions which are illustrated in FIG. 3 by solid-line circles representing domain positions where an interaction takes place and broken-line circles representing other domain positions. A domain may be present or absent at any particular position at any given time.

An address insertion interaction sequence can be considered to begin with domains at position L1 in the lower register 41, and U1 in the upper register 40. At this time the rotating field is oriented upward so that an attractive field concentration is present at the upper ends of all vertical segments in the overlay pattern. When the field next reorients to the left, the domains move to positions L2 and U2, respectively; and they thereafter shift to the positions L3 and U3 when the field reorients to a downward position. Upon reorientation of the field toward the right, the preferred domain position in register 40, in the absence of domain interaction, is, of course, the position U4. However, since a domain is simultaneously present in register 41 at L4, the two domains repel one another; and the domain in register 41 assumes the position L4 while the domain in register 40 moves upward to the position U4*a*. Thereafter the domain from position L4 moves through positions L5 and L6 in its continued propagation to the right; whereas the domain at position U4*a* moves successively through positions U5 through U7 to enter into the control memory loop 38. As the rotating field continually reorients, the domain from position U7 is propagated up the left-hand side of control memory loop 38 and a domain thereafter propagates down the right-hand side, if a busy bit had been encountered, to circulate in the usual manner for loop propagation paths.

Each time a domain in the loop 38 enters the fanout region 43 a single domain is caused to propagate upward in the loop 38, and a train of ten domains is produced at another output of fanout region 43 for application through the propagation path 48 to the gate 23'. The latter gate comprises illustratively an overlay element 67 that is advantageously of angular format and which replaces a T in the data shift register 19'. Also included in the gate 23' is a lazy T element 68 which replaces a simple vertical bar that would otherwise be shared by the registers 19' and 20'. The element 68 corresponds to the FIG. 2 coupling path 51. As the rotating field reorients through one and a half cycles, a control domain in path 48 moves successively through the positions from position G1 in path 48 to position G7 in the data path of register 19'. That gate domain is thereafter propagated to the left toward domain annihilator 31 in FIG. 2. In such passage it will be seen that the gate domain occupies a dual position G4,5 at the apex of the overlay element 67 while the field is reorienting from a downward orientation through the right-hand orientation and the upper orientation.

In the absence of a control domain at position G3, a data domain in register 19' passes through positions D1 through D3, G4,5, G6, and G7 and is unaffected by the gate 23'. However, when a control domain is present at position G3 simultaneously with a data domain at the position D3 while the magnetic field is oriented downward, the control domain has no alternate propagation path as the field rotates toward the right-hand orientation. However, the data domain does have an alternate path and moves at that time to the position D4 in the center of the lazy T 68, as a result of the repulsion between the domains propagating from the positions G3 and D3. Thereafter the data domain proceeds through the positions D5 through D7 during successive reorientations of the rotating field. Ultimately the data domain is propagated through the register 20' to the right and out of the time slot interchanger 10.

The busy bit domain interaction region 33 is fully illustrated in the drawing, and the similar interaction region 32 is also illustrated. Busy bit operation will be described in connection with the region 32. A control domain moving upward along the left-hand side of control memory loop 37 always passes from a domain position C1 in the control memory loop through the positions C2 through C6 into the data path of register 19' during successive reorientations of the rotating field in one and a quarter cycles of rotation. In the absence of a control domain, a data bit of the busy bit type moves along register 19' through positions B1 through B3, and C4 through C6 during a similar one and a quarter cycles of magnetic field reorientation. However, when a control bit is present at the position C2 and a busy bit domain is present at position B2, the two domains repel one another so that the busy bit, the only one of the two with an alternate propagation path, is forced into the control memory loop at position B3*a* as the field reorients from the right-hand direction toward the upper direction. Thus, the control domain and the data busy bit domain have exchanged functions as previously described.

The foregoing discussion is related to time slot interchangers wherein two data shift registers are operated simultaneously in opposite directions with respect to a set of control gates in coupling paths between corresponding stages of the registers. A similar time slot interchanging result is also advantageously produced by employing a buffer register in the coupling paths between the shift registers, and actuating individual coupling paths selectively during the operation of only one of the shift registers with respect to the time slot signals which are being coupled through the coupling paths.

Figure 4:
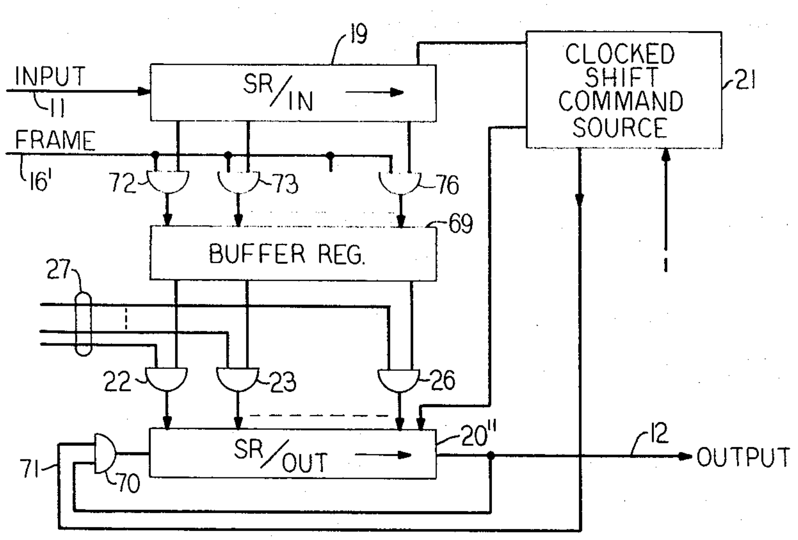
FIG. 4 is a portion of a modified time slot interchanger in accordance with the invention.

FIG. 4 is a partial diagram of a modified time slot interchanger in accordance with the invention, and it utilizes a buffer register 69 in the coupling paths. "Time slot switcher" is the name sometimes used for the part of the interchanger actually shown in FIG. 4 because control memory and address insertion circuits are omitted. The clocked shift command source 21 actuates the shift registers 19 and 20'' at the same times and at the bit rate of input path 11 signals, which are provided on a bit-series basis. However, output register 20'' can also be actuated at a rate which is greater than the input rate where it is necessary to accommodate different bit rates. In one embodiment, the interchanger is advantageously operated at a bit rate which is twice the information bit rate of incoming signals. Consequently, the interchanger is said to have input and output interchanger signal operation frames because the frames have a format in which time slot words in the first half of each operation frame are all-ZEROs, and the second half-frame contains a full multiplexed information frame. In this case the shift registers and buffer have a storage capacity of only one-half of an operation frame but a full information frame.

At the end of each operation frame a gate pulse on a circuit 16' from the central control processor 13 is received and operates simultaneously a set of coupling gates 72, 73, and 76, which are provided for coupling time slot signals from the input shift register 19 to corresponding stages of the buffer register 69. Thus, the latter gates must be provided at each bit storage stage of the register 19 for coupling the output of such stage to the input of a corresponding bit storage stage in register 69. Likewise each of the gates shown in FIG. 4 for the set of coupling gates 22, 23, and 26 schematically represents plural gates if plural bits are utilized in each word of an information frame.

During the information signal frame following the one in which a particular frame gating pulse appeared on the circuit 16', the control gates 22, 23, and 26 are selectively operated in much the same manner previously described in connection with FIG. 1 by enabling signals applied by way of conductors 27 from the control memory and decoder 18. During such operation of the control gates, output shift register 20'' is operated in the shifting mode in the same direction, with respect to the coupling paths through those gates, as the shift register 19. Since the shift registers operate with a buffer, the half-word problem does not arise. Each input time slot signal has access to any time slot position of a signal frame which is to be supplied to output path 12 by the output shift register 20''. Although the interchanger of FIG. 4 produces time slot interchanging results corresponding to those produced by the interchanger of FIG. 1, it will subsequently be seen in connection with FIG. 6 that the addition of the buffer register 69 performs a very useful function in certain interchanger applications.

Writing the control memory for the interchanger of FIG. 4 can be realized in different ways. For example, an analogous set of registers are employed in a way similar to that already described for the embodiment of FIG. 2 for responding to time coded input signals for automatically entering a control signal bit into a control memory loop for a particular selection gate. Alternatively, the desired gate number and switching time slot number can be computed from the known input and output time slot numbers for the interchanger, and then the gate number is stored in the switching time slot word location of a conventional control memory for controlling signals on all of the circuits 27.

In FIG. 4, control memory positions for all-ZERO parts of an operation frame are necessarily unused, as are portions that would normally be unused in any embodiment because they do not represent time slots for usefully operating certain control gates in accordance with the time slot interchanging concept here presented. For example, in FIG. 1, gate 22 would be operated only for the final input time slot of a frame because until the time there is no time slot position of the corresponding output frame in register 20 under gate 22. In FIG. 4 memory capacity may be conserved by making each memory loop only one information signal frame in length instead of one operation frame in length. That change causes each interchanger control gate which must be used to be operated twice in each operation frame with the result that some time slot signals can get into the wrong half of an operation frame. If time slot positions in an operation frame are assigned numbers increasing from right to left in FIG. 4, and $TS_i=k$ and $TS_o=m$, then when $m \quad k$ the input time slot signal can be transferred to register 20' in the first half of such frame following entry of the signal into buffer register 69. However, when $m<k$ the transfer cannot take place until the second following half of such frame. This situation is corrected by causing the output of register 20' to be recirculated through a coincidence gate 70 which is enabled by a train of all-ONE gate-enabling signals on circuit 71 from source 21 during the first half of each operation frame. Thus, every time slot signal is forced into the second half of an operation frame following transfer into buffer register 69, regardless of the relative sizes of input and output time slot numbers for a given call connection.

Figure 5:
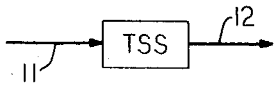
FIG. 5 is a schematic representation of a time slot interchanger of the invention.

FIG. 5 is a schematic representation of a time slot switcher in accordance with the present invention, and this representation is used to depict any of the switcher forms within the scope of the invention. The particular type of switcher represented will be indicated by ascertaining the type of external controls which are shown as applied to the switcher. Thus, a time slot switcher indicated simply as shown in FIG. 5 would correspond to the embodiment previously discussed in connection with FIGS. 2 and 3 wherein the only external control for normal interchanger operation is the rotating inplane field. The embodiment illustrated in FIG. 6 utilizes additional external controls which indicate an interchanger embodiment of the type illustrated in FIG. 4.

Figure 6:
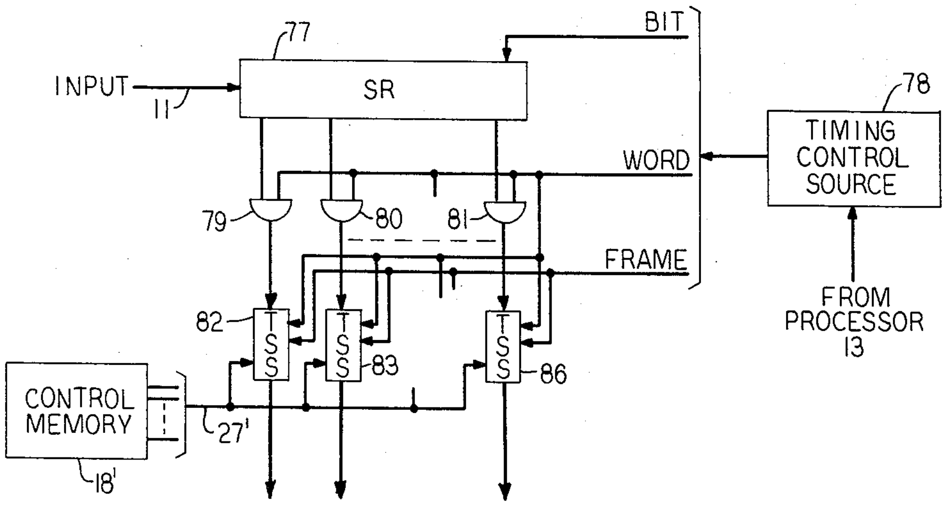
FIG. 6 is another modified interchanger of the invention.

FIG. 6 illustrates a modified form of the invention for handling, in a bit-parallel word-series fashion, the time division signal frames which appear on input path 11 in bit-series fashion. A time slot interchanger as shown in FIG. 6 is useful where the available shift register hardware shifts too slowly for pure bit-series operation. Thus, time division signals from the input path 11 are supplied in bit-series to a shift register 77 which includes a number of stages equal to the number of bits in a time slot word in an input signal frame. The register 77 is operated at the input signal bit rate by timing control signals from a timing control source 78 that is operated under the control of the processor 13.

At the end of each time slot word, the bit signals for such a word are all contained in the shift register 77; and a word rate timing pulse from source 78 is applied to coupling gates 79, 80, and 81 for simultaneously coupling the signal bits from register 77 through the gates to input signal paths of individual time slot switchers 82, 83, and 86, respectively. These switchers receive shift commands for their respective input and output shift registers at the time division signal word rate from the timing control source 78. The same switchers also receive, at the time division signal frame rate, additional timing signals which operate their respective sets of coupling gates 72, 73, and 76. Thus, the signals of each time slot word which are transferred in bit parallel from the register 77 to the respective time slot switchers are propagated in the same fashion through the input shift registers of those switchers at the time slot word rate. Then at the end of each frame, the signal bits for each corresponding bit position within a time slot word are transferred in bit parallel to the buffer register 69 of the respective time slot switchers 82, 83, and 86. Now the interchanging function takes place in response to control gate selection signals applied from control memory and decoder 18′ on circuits 27′ in multiple to corresponding control gates of the gate set 22, 23, and 26 in each time slot switcher.

Time slot interchanged outputs of the various switchers are then available in a new bit-parallel sequential arrangement for respective time slot words, and can be accommodated in the rest of the time division communication network in this fashion, or they can be restored to the bit-series arrangement, depending upon the needs of a particular time division system application. If conversion to the bit-series format is required, it can be readily achieved by simply gating the switcher outputs at the end of each time slot word into a shift register, not shown, which is operated at the signal bit rate to supply the rearranged time division signals to the output time division signal path 12.

Although the present invention has been described in connection with particular embodiments thereof, it is to be understood that additional embodiments and modifications which will be obvious to those skilled in the art are included within the spirit and scope of the invention.

What is claimed is:

1. A time slot interchanger comprising first shift register means for receiving time division multiplex signals including a succession of time slot signals in recurrent time frames, said register means including a sufficient number of stages connected in cascade to store at one time at least a portion of each of the time slot signals of at least one of said time frames, means for coupling output signals from one or more of said stages at a time, second shift register means including a sufficient number of stages connected in cascade to store at one time at least a portion of each of the time slot signals of at least one of said time frames, said coupling means includes means for selectively coupling each of the last-mentioned stages to receive signals from only a different predetermined stage of said first shift register means, means for supplying shift control signals for operating said first and second shift register means, and means for actuating said coupling means while at least one of said first shift register means and said second shift register means is being operated as a shift register with respect to signals being coupled by said coupling means.

2. The time slot interchanger in accordance with claim 1 in which said means for supplying shift control signals comprises means for shifting time slot signals into said first shift register means at the same time that said second shift register means is operated for thereby, in effect, shifting time slot locations through said second register means, and said coupling means includes a coupling path from each stage of said first shift register means to a corresponding stage of said second shift register means, and means for applying each time slot signal in said first shift register means to a preselected one of said time slot locations in said second shift register means as such signal and location are shifted through correspondingly coupled stages of said first and second shift register means.

3. The time slot interchanger in accordance with claim 1 in which said shift register means comprise a sheet of magnetic material in which single wall domains can be moved, an overlay of magnetic material for providing magnetic poles to attract domains in the presence of a magnetic field in the plane of said sheet, said overlay being configured to define first and second domain propagation channels for said first and second shift register means, domain interaction positions at said output signal stages of said first channel, coupling channels from said positions to corresponding stages of said second channel, and control propagation channels for said actuating means for supplying a domain to each interaction position whenever a first channel domain is to be coupled to said second channel at such position.

4. The time slot interchanger in accordance with claim 1 in which said supplying means includes means for operating said first and second shift register means in alternate ones of said time slots.

5. The time slot interchanger in accordance with claim 1 in which said time division multiplex signals include plural signal bits in each time slot, and said coupling means comprises gating means at half-time-slot intervals along said first and second shift register means.

6. The time slot interchanger in accordance with claim 1 in which said first shift register means comprises a plurality of input shift registers each having an input to receive signals from a different signal path and each having an output, said second shift register means comprises a plurality of output shift registers each having an input and having an output to apply signals to a different output signal path, and said coupling means include means for applying output signals from stages of each of said input shift registers to inputs of corresponding stages of only a corresponding one of said output shift registers.

7. The time slot interchanger in accordance with claim 6 in which said first shift register means further comprises a distributing shift register means for receiving time division signals at an input thereof from a time division signal path, said distributing shift register means including means for periodically coupling an output from each stage thereof to an input of a different one of said input shift registers.

8. The time slot interchanger in accordance with claim 1 in which said coupling means comprises plural gating means, each interconnecting a stage of said first shift register means to only one stage of said second shift register means, said actuating means comprises a plurality of recirculating control memory loops, means for coupling an output of each of said control memory loops to a different one of said gating means for actuating such gating means recurrently in successive ones of said time frames in accordance with the pattern of signal representations stored in such memory loop, and said shift control signal supplying means further includes means for supplying shift control signals for operating said control memory loops in unison with said first and second shift register means.

9. The time slot interchanger in accordance with claim 8 in which said actuating means comprises time coded signaling means for writing a predetermined pattern of signal representations into each of said control memory loops.

10. The time slot interchanger in accordance with claim 9 in which said shift control signal supplying means comprises means for causing shifting in said first and second shift register means in opposite directions with respect to said gating means.

11. The time slot interchanger in accordance with claim 1 in which said selective coupling means comprises a buffer register, means for gating the contents of said first shift register means into said buffer register at the end of each of said time frames, gating means for coupling an output of each stage of said buffer register to only a different stage of said second shift register means, and means for selectively actuating said gating means in each time slot, the last-mentioned actuating means including means for operating the gating means while said second shift register is operating.

12. The time slot interchanger in accordance with claim 11 in which said shift control signal supplying means comprises means for shifting signals in said first shift register means and in said second shift register means in the same direction with respect to said selective coupling means.

13. The time slot interchanger in accordance with claim 11 in which said second shift register means further comprises means for controllably recirculating an output thereof to an input thereof, and means for enabling said recirculating means during only a first part of each of said time frames.

14. The time slot interchanger in accordance with claim 11 in which said means for supplying control signals comprises means for operating said first shift register means at a first signal rate, and means for operating said second shift register means at a second signal rate which is larger than said first rate.

15. In combination, a magnetic single-wall domain shift register having a plurality of selectively gated output connections at different stages thereof, a plurality of magnetic single-wall domain recirculating memory means for storing in each of said memory means a predetermined pattern of control signal representations, magnetic single-wall domain means for coupling an output of each of said recirculating memory means for actuating a different one of said gated output connections in accordance with a predetermined pattern of signal representations in such memory means, and means for supplying reorienting magnetic field shift control signals for operating said shift register and said memory and coupling means in unison.

* * * * *

UNITED STATES PATENT OFFICE
CERTIFICATE OF CORRECTION

Patent No. 3,770,895 Dated November 6, 1973

Inventor(s) Roy S. Krupp and Lawrence A. Tomko

It is certified that error appears in the above-identified patent and that said Letters Patent are hereby corrected as shown below:

Column 7, line 34, "it" should read --its--; line 56, "in" should read --is--. Column 12, line 10, "positions" should read --portions--; line 18, "the", first occurrence, should read --that--; line 29, "m k" should read --m≥k--.

Signed and sealed this 9th day of April 1974.

(SEAL)
Attest:

EDWARD M.FLETCHER,JR.
Attesting Officer

C. MARSHALL DANN
Commissioner of Patents